E. J. GOULD.
COMPENSATING GEAR.
APPLICATION FILED APR. 3, 1908.
921,978.
Patented May 18, 1909.
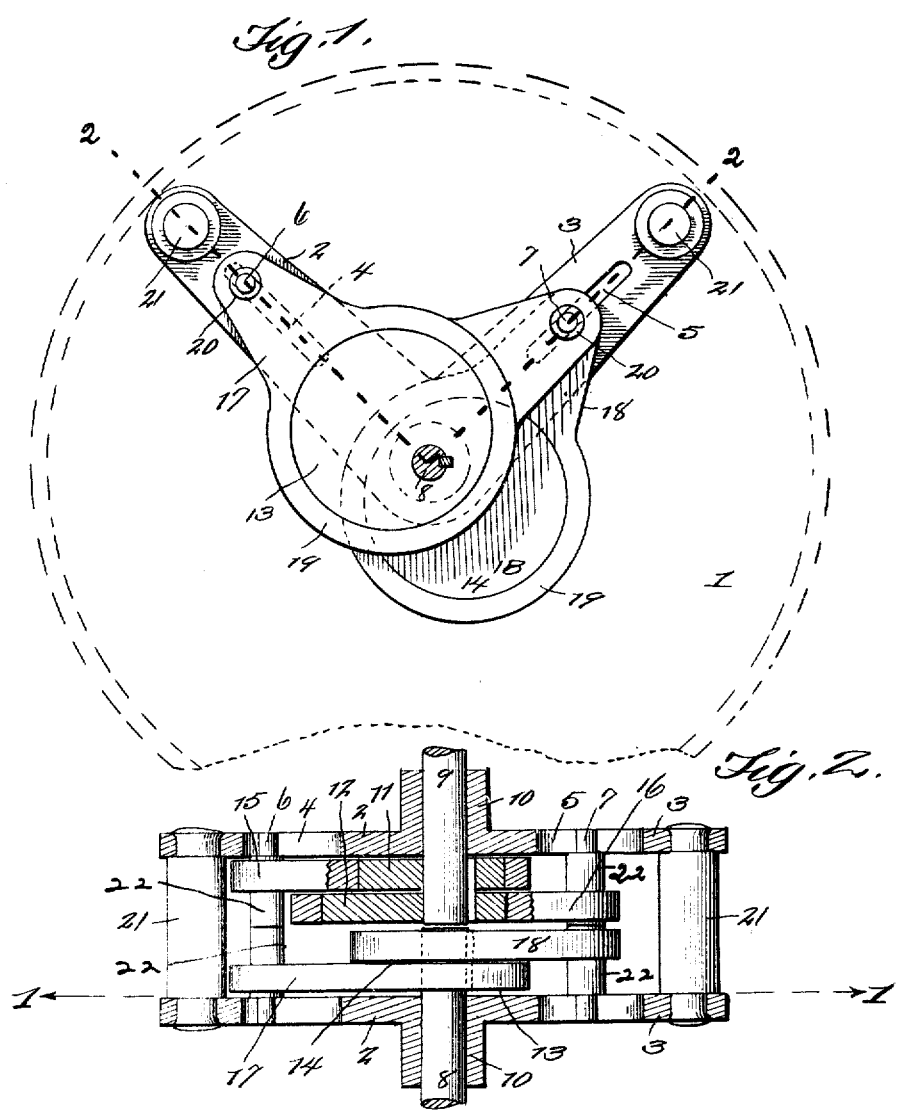
Witnesses
R. A. Burrell
M. A. Bond.
Inventor
Edwin J. Gould.
By E. H. Bond
Attorney

UNITED STATES PATENT OFFICE.

EDWIN J. GOULD, OF BOULDER, COLORADO, ASSIGNOR OF ONE-FOURTH TO JAMES A. WALKER, OF BOULDER, COLORADO.

COMPENSATING GEAR.

No. 921,978.                Specification of Letters Patent.            Patented May 18, 1909.

Application filed April 3, 1908. Serial No. 424,997.

*To all whom it may concern:*

Be it known that I, EDWIN J. GOULD, a citizen of the United States of America, and resident of Boulder, in the county of Boulder and State of Colorado, have invented certain new and useful Improvements in Compensating Gear, of which the following is a specification.

This invention relates to compensating gear of the type shown in my United States Patent #845,409 issued to me February, 26, 1907.

The present invention has for its objects among others to improve and simplify the construction as well as to increase the efficiency in operation. The eccentrics are fastened together in pairs which are controlled by links which latter are also fastened together in pairs. These pairs alternate, that is to say, the pair of links never engage a pair of eccentrics, but engage one edge of opposite pairs of eccentrics.

The present construction is adapted for use as a reverse gear when made with ball bearings; also as transmission gear, and means of converting a reciprocatory motion into a rotary motion without any dead center.

Other objects and advantages of the invention will hereinafter appear and the novel features thereof will be particularly pointed out in the appended claims.

The invention is clearly illustrated in the accompanying drawings which, with the numerals of reference marked thereon, form a part of this specification and in which—

Figure 1 is a side elevation partly in section of a compensating gear constructed in accordance with the present invention, the section being as on the line 1—1 of Fig. 2. Fig. 2 is a section on the line 2—2 of Fig. 1 with parts in elevation.

Like numerals of reference indicate corresponding parts in the different figures of the drawing.

Referring to the drawing, 1 designates a driving element which may be in the nature of a hollow disk-shaped casing, as shown in Fig. 1 and as illustrated in my prior patent above referred to. But it may assume any other form, as, for instance, two arms 2 and 3 arranged at an angle of ninety degrees, as seen in Fig. 1. This driving element, of which either form may be employed, is designed to be rotated from any suitable source of power (not shown) so as to transmit its motion to the driven element soon to be described. The driving element 1 is formed with elongated slots 4 and 5 which instead of being formed diametrically opposite each other, as in my prior patent, are arranged at an angle of ninety degrees to each other, as seen in Fig. 1. In these slots are mounted to slide pins or bolts 6 and 7 respectively.

The driven elements 8 and 9 are preferably in the nature of oppositely extending independent shafts having their inner ends arranged in close proximity to each other, as seen in Fig. 2. They are suitably mounted in bosses or the like 10 extending from opposite sides of the casing, or arms, as seen best in Fig. 2. These driven elements 8 and 9 in one embodiment of the present invention may be connected with the drive wheels of a motor vehicle, so that said wheels will be individually driven from the driving element 1 in such a manner that they can rotate at different speeds in turning curves.

While in the present instance I have chosen to show but one pair of eccentrics on each shaft and as many pairs of links, it is to be here noted that there may be more than one pair of eccentrics and a corresponding number of links for each shaft, although the number shown is deemed most efficient for ordinary purposes.

Each of the driven elements 8 and 9 inside the casing or the equivalent thereof formed by the parallel arms 2 and 3 of the driving element is provided with two eccentrics 11 and 12 and 13 and 14 respectively. The eccentric 11 is connected by link 15 with the pin or bolt 6 and the eccentric 12 is connected by link 16 with a pin or bolt 7. The eccentric 13 is connected by link 17 with the pin or bolt 6 and the eccentric 14 is connected by link 18 with the pin or bolt 7, all as shown best in Fig. 2. It will be understood that each of the links is formed at its inner end with a large eye or the like 19 to embrace the eccentric while at the outer end each link is formed with a small eye 20 to surround the sliding pin or bolt with which it is connected, as seen clearly in Fig. 1.

As seen best in Fig. 2 the links are formed with bosses 22, those on the outside links extending inwardly only, and those on the inside links extending outwardly only; these bosses serve as spacing devices to keep the links in parallelism, the adjacent ends of the bosses on the outside links abutting. By this arrangement all links are duplicates of each other and the manufacture and assemblage of the parts is materially facilitated and cheapened.

When the driving element is composed of the parallel arms 2 and 3, the free ends thereof are connected by suitable members 21 forming as it were a casing between which the eccentrics and the links are disposed.

By reference to the drawing it will be seen that the relative arrangement of the parts in the present instance is different from that shown in the patent heretofore referred to. The slots 4 and 5 in the present instance are disposed at an angle of ninety degrees to each other, and the eccentrics are arranged in pairs, those of one pair being adjacent each other and those of the other pair farthest removed from each other, as seen best in Fig. 2. It will be noted that in thus moving the slots ninety degrees the eccentrics have been moved just the same amount. This will hold true with any amount of degrees or angles, for instance, if the slots were at forty-five degrees one pair of eccentrics would be at forty-five degrees and the other pair at the sum of forty-five and ninety, or one hundred and thirty-five degrees, and so on.

As will be clearly understood, one pair of eccentrics have their long centers opposite and the other pair have theirs together. The pairs of links never engage a pair of eccentrics, but engage one each of opposite pairs of eccentrics.

The operation will be clearly understood from the foregoing description when taken in connection with the annexed drawings, it being understood of course that the rotary movement of the driving element 1 is imparted through the slidable pins 6 and 7 and the pairs of links to the eccentrics and the driven elements 8 and 9.

Modifications in detail may be resorted to without departing from the spirit of the invention or sacrificing any of its advantages.

What is claimed as new is:—

1. A compensating gear comprising a plurality of driven elements with their adjacent ends substantially abutting, a pair of outside eccentrics, a pair of inside eccentrics, one of each pair being fast on each of said elements, and a driving element having links connected with said eccentrics, each link with a boss projecting from one side only, said links being fastened together in pairs and controlling said eccentrics, said pairs being disposed with one pair of links embracing both outside eccentrics, the other pair of eccentrics being inside and abutting together and embraced by the other pair of links, all of said links being duplicates, the bosses of the outer links abutting and those of the inner links projecting outwardly, the links of each pair being at an angle of substantially 90° to each other.

2. A compensating gear comprising a plurality of driven elements with their adjacent ends substantially abutting, a pair of outside eccentrics, a pair of inside eccentrics, one of each pair being fast on each of said elements, and a driving element having links connected with said eccentrics, each link with a boss projecting from one side only, said links being fastened together in pairs and controlling said eccentrics, said pairs being disposed with one pair of links embracing both outside eccentrics, the other pair of eccentrics being inside and abutting together and embraced by the other pair of links, all of said links being duplicates, the links of each pair being at an angle of substantially 90° to each other, the driving element having slots in which said links are guided, and bosses on the links, those on the outside links extending inwardly only and those on the inside links extending outwardly only and forming spacing devices.

Signed by me at Boulder, Colo., this 30th day of March, 1908.

EDWIN J. GOULD.

Witnesses:
DAVID S. WHITE,
J. A. GRIFFIN.